United States Patent
Cho et al.

(10) Patent No.: US 9,639,986 B2
(45) Date of Patent: May 2, 2017

(54) HEAD MOUNTED DISPLAY AND METHOD OF CONTROLLING THEREOF

(71) Applicant: LG ELECTRONICS INC., Seoul (KR)

(72) Inventors: Eunhyung Cho, Seoul (KR); Jongho Kim, Seoul (KR); Doyoung Lee, Seoul (KR); Jihwan Kim, Seoul (KR); Sinae Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 14/193,971

(22) Filed: Feb. 28, 2014

(65) Prior Publication Data

US 2015/0199849 A1  Jul. 16, 2015

(30) Foreign Application Priority Data

Jan. 13, 2014 (KR) .................. 10-2014-0003971

(51) Int. Cl.
G06T 19/00 (2011.01)
G02B 27/00 (2006.01)
(Continued)

(52) U.S. Cl.
CPC ........ *G06T 19/006* (2013.01); *G02B 27/0093* (2013.01); *G02B 27/017* (2013.01); *G06F 3/012* (2013.01); *G06F 3/04815* (2013.01); *G06F 8/38* (2013.01); *G02B 2027/014* (2013.01); *G02B 2027/0138* (2013.01); *G02B 2027/0178* (2013.01)

(58) Field of Classification Search
CPC ...... G02B 2027/0138; G02B 2027/014; G02B 2027/0178; G02B 27/0093; G02B 27/017; G06F 3/012; G06F 3/04815; G06F 8/38; G06T 19/006
See application file for complete search history.

(56) References Cited

U.S. PATENT DOCUMENTS 7,002,578 B1  2/2006  Ritter
8,436,872 B2  5/2013  Wright et al.
(Continued)

FOREIGN PATENT DOCUMENTS

JP  2011-215887 A  10/2011
JP  2012-2568 A  1/2012

*Primary Examiner* — Kenneth Bukowski
(74) *Attorney, Agent, or Firm* — Birch, Stewart, Kolasch & Birch, LLP

(57) ABSTRACT

The present specification relates to a head mounted display (HMD) and a method of controlling therefor. More specifically, the present specification provides a method for a user wearing an HMD to recognize at least one object positioned at the front via a virtual map. The HMD includes a display unit configured to display visual information, a position sensing unit configured to sense a position of the HMD, a camera unit configured to sense at least one object positioned at the front of the HMD, and a processor configured to control the display unit, the position sensing unit, and the camera unit. The processor is further configured to obtain position information of the HMD, generate a first virtual map indicating a virtual object corresponding to the at least one object positioned at the front of the HMD, based on the position information of the HMD, and display the first virtual map.

17 Claims, 15 Drawing Sheets

(51) Int. Cl.
*G02B 27/01* (2006.01)
*G06F 3/01* (2006.01)
*G06F 3/0481* (2013.01)
*G06F 9/44* (2006.01)

(56) References Cited

U.S. PATENT DOCUMENTS

| | | |
|---|---|---|
| 8,498,816 B2 | 7/2013 | Miyamoto |
| 2007/0227020 A1 | 10/2007 | Barany |
| 2010/0328344 A1 | 12/2010 | Mattila et al. |
| 2011/0022311 A1* | 1/2011 | Lee ..................... G01C 21/36 701/532 |
| 2011/0188760 A1* | 8/2011 | Wright ................. G06T 17/05 382/203 |
| 2012/0179369 A1 | 7/2012 | Lapidot et al. |

* cited by examiner

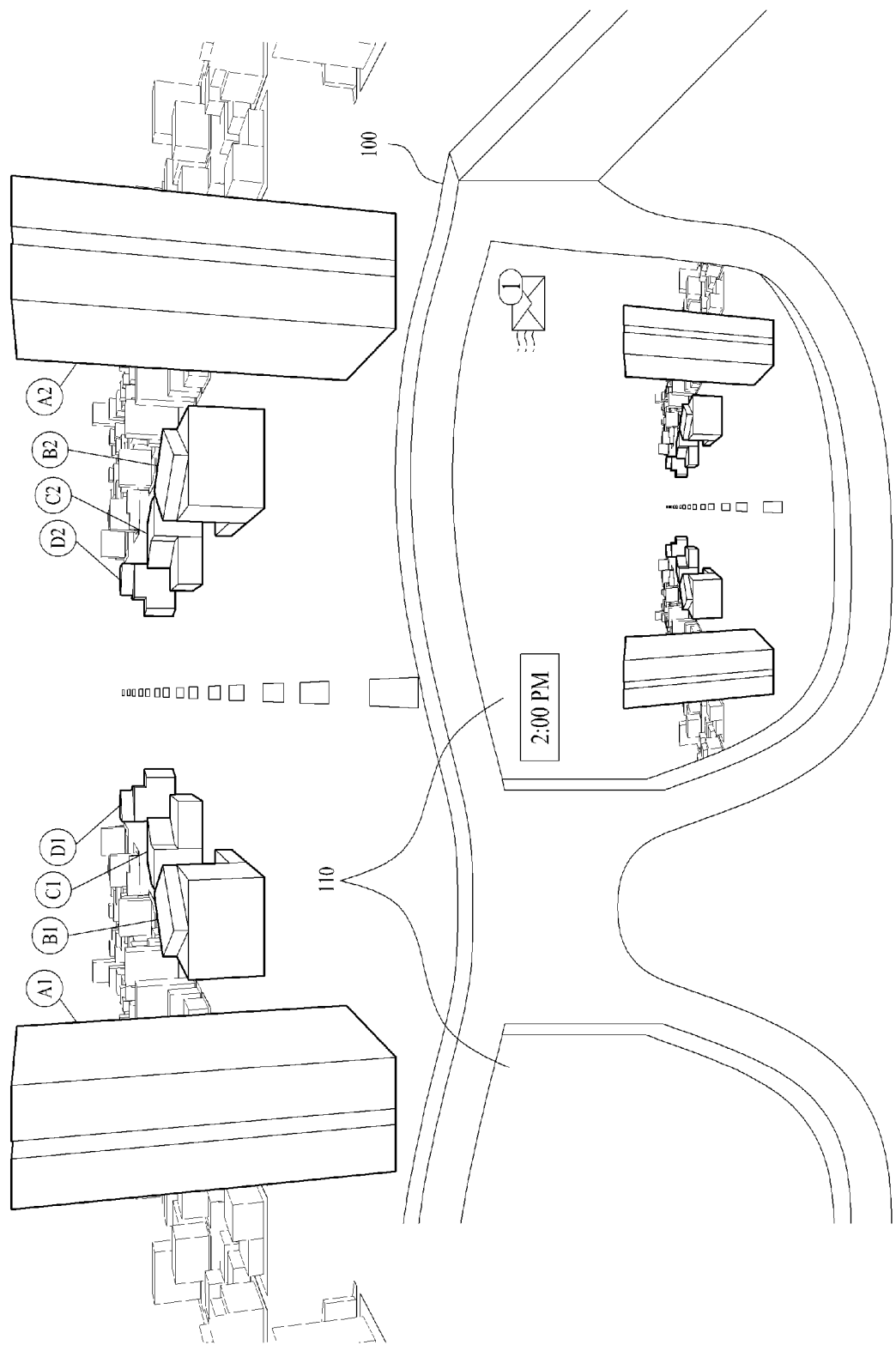

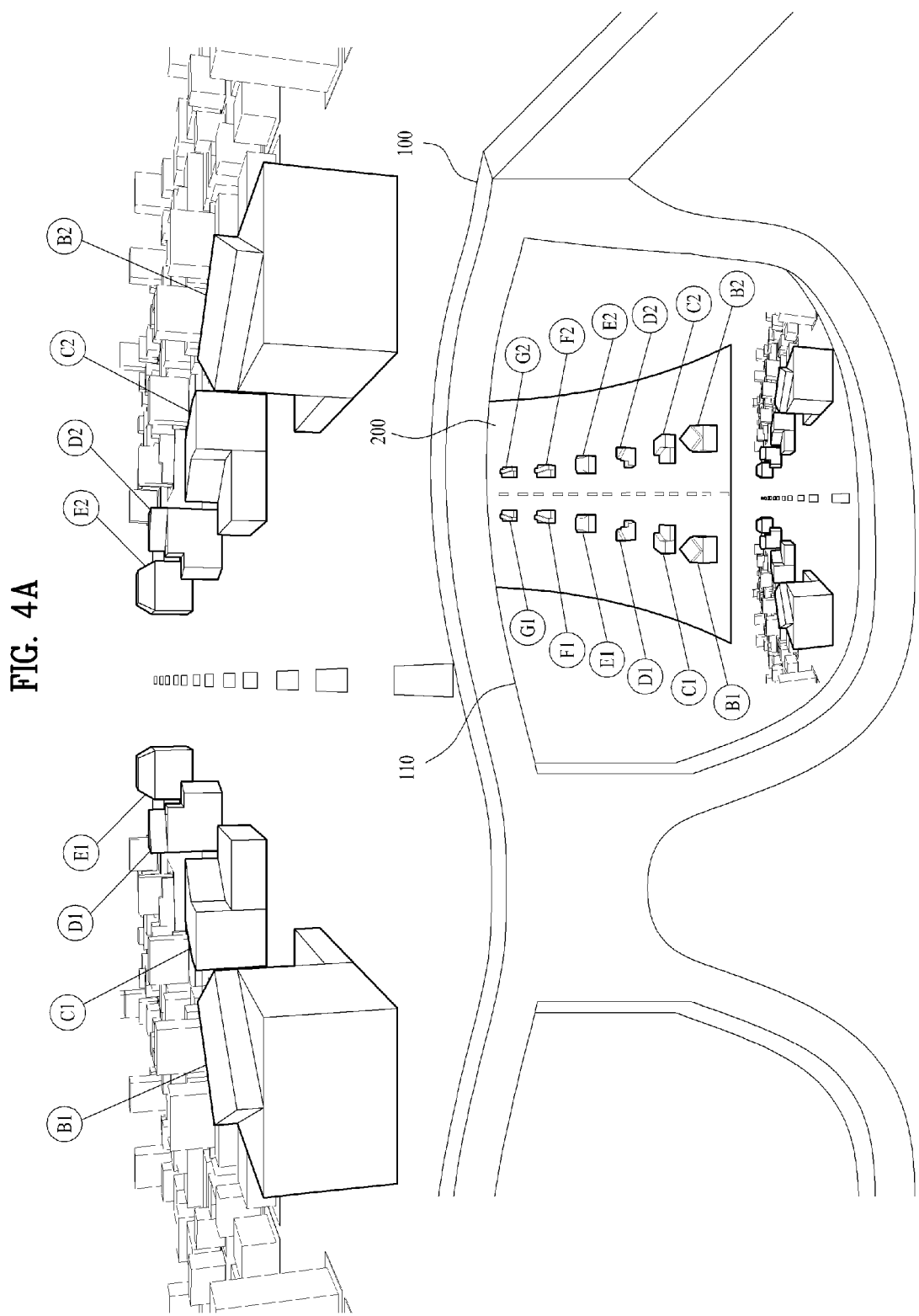

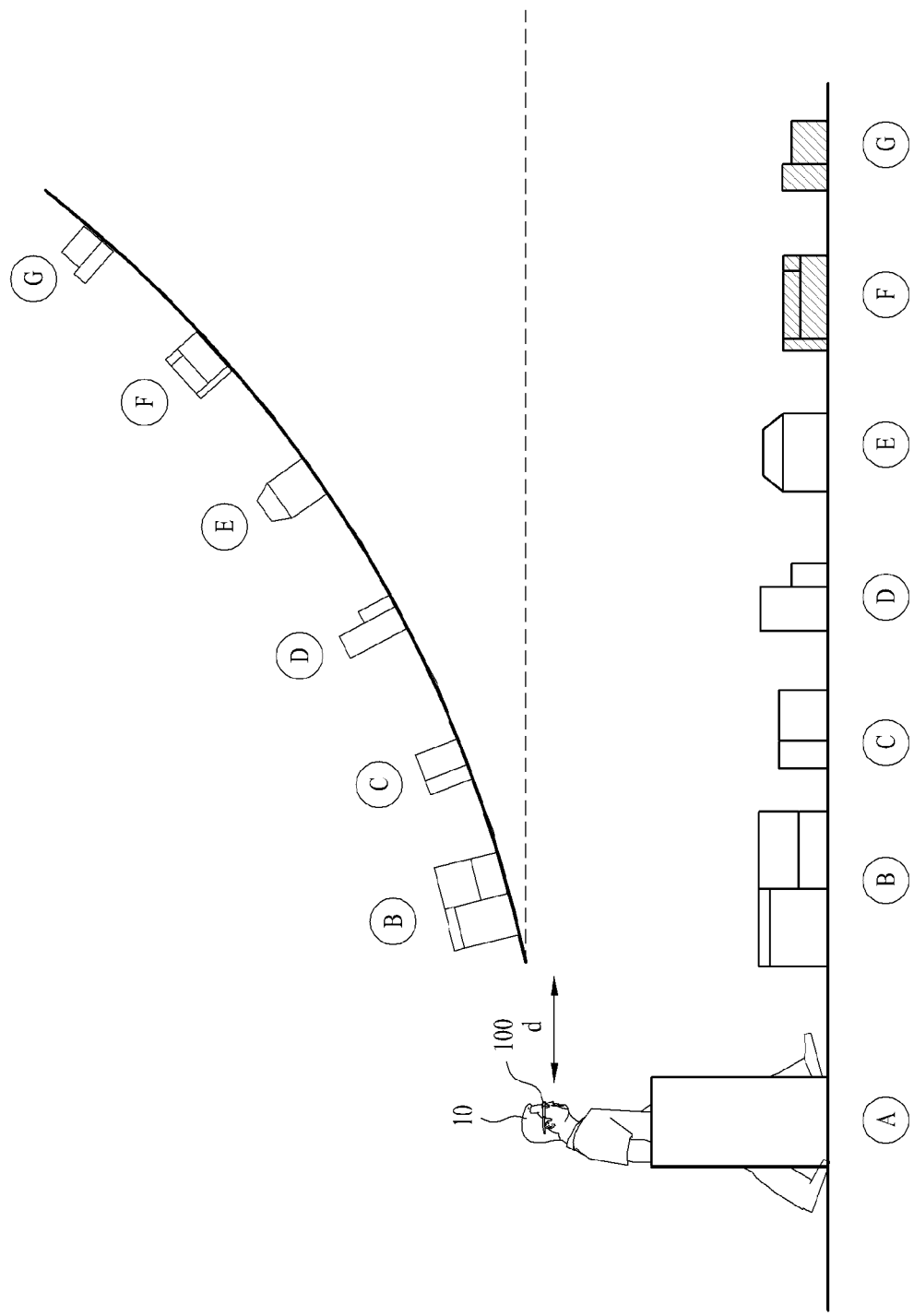

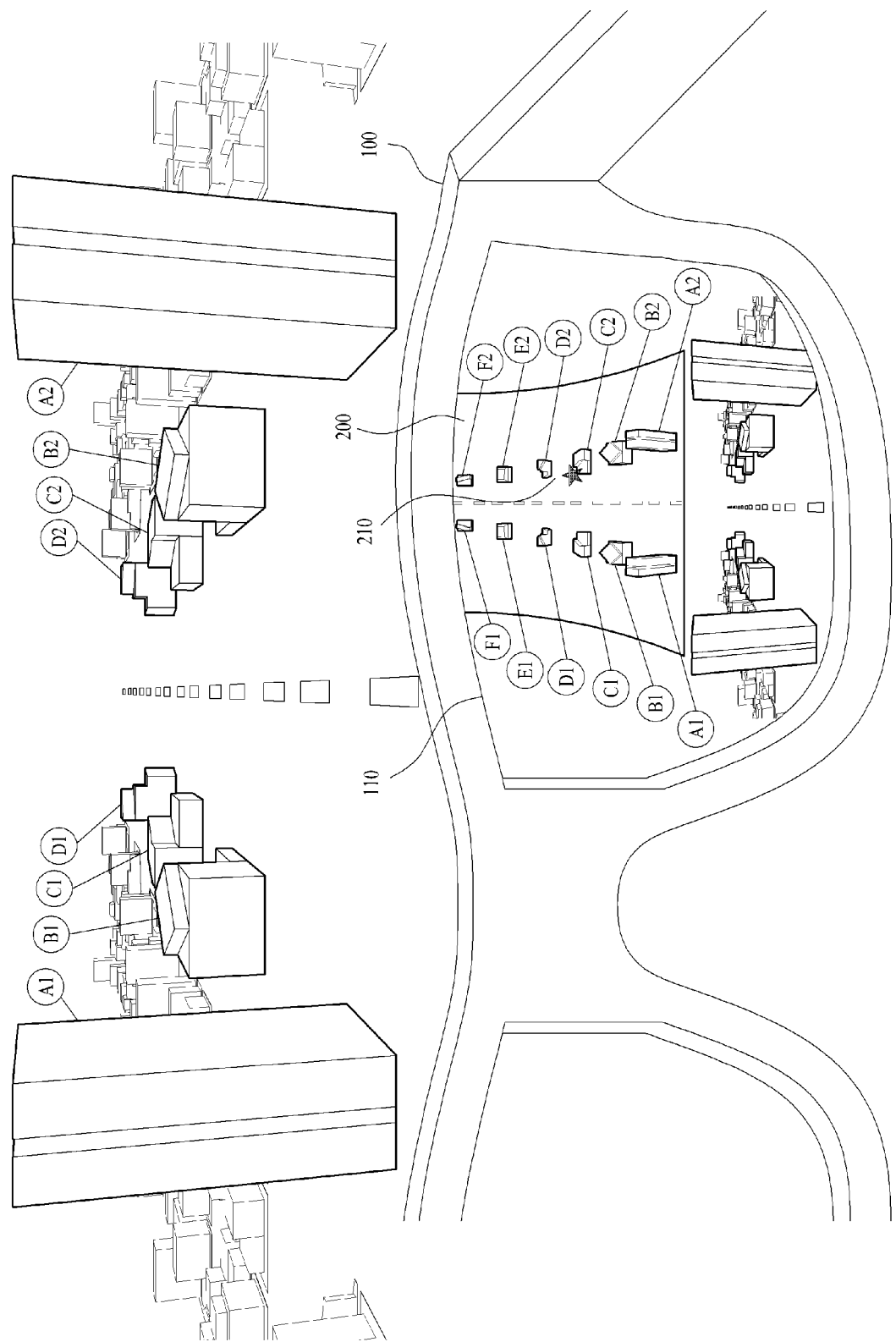

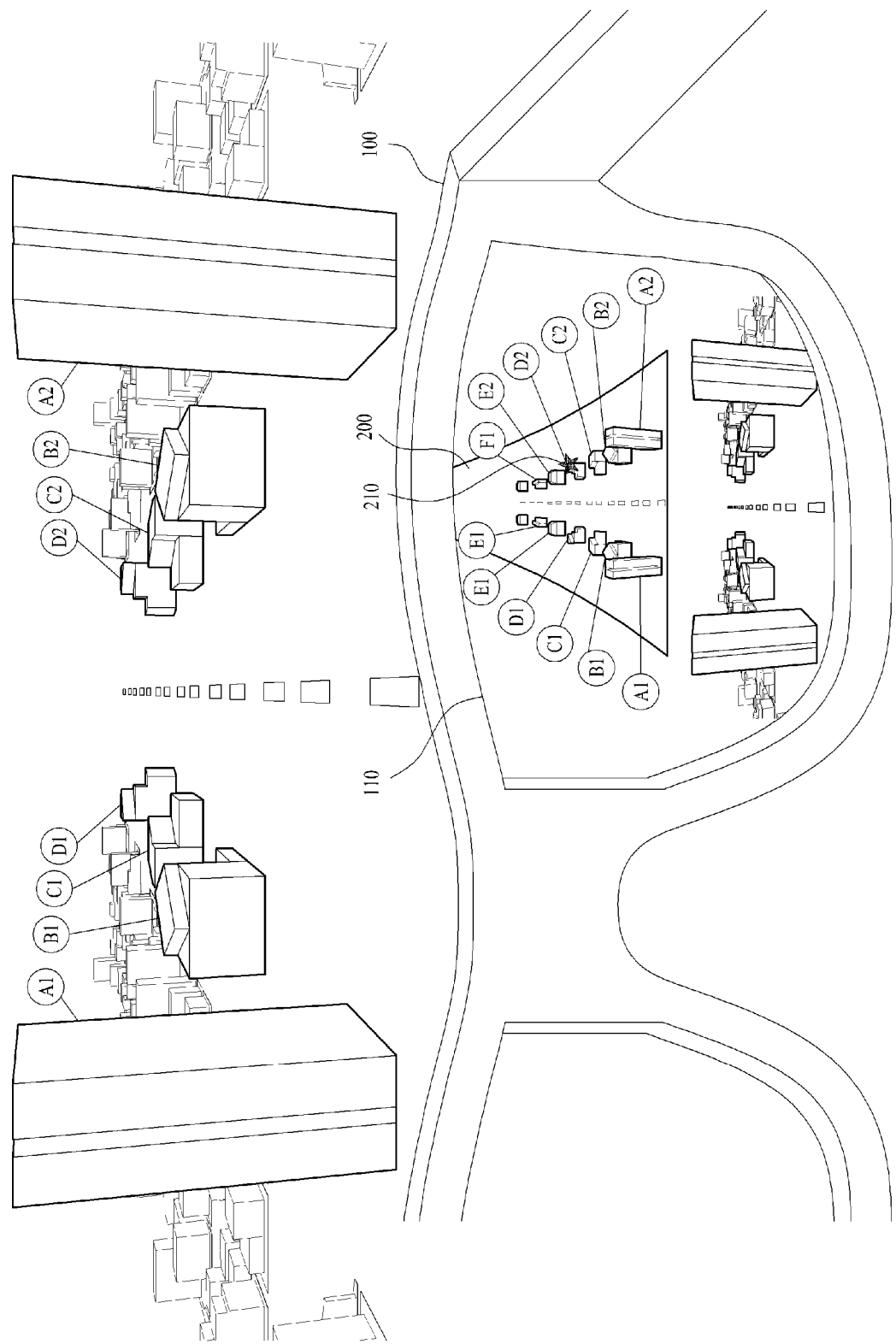

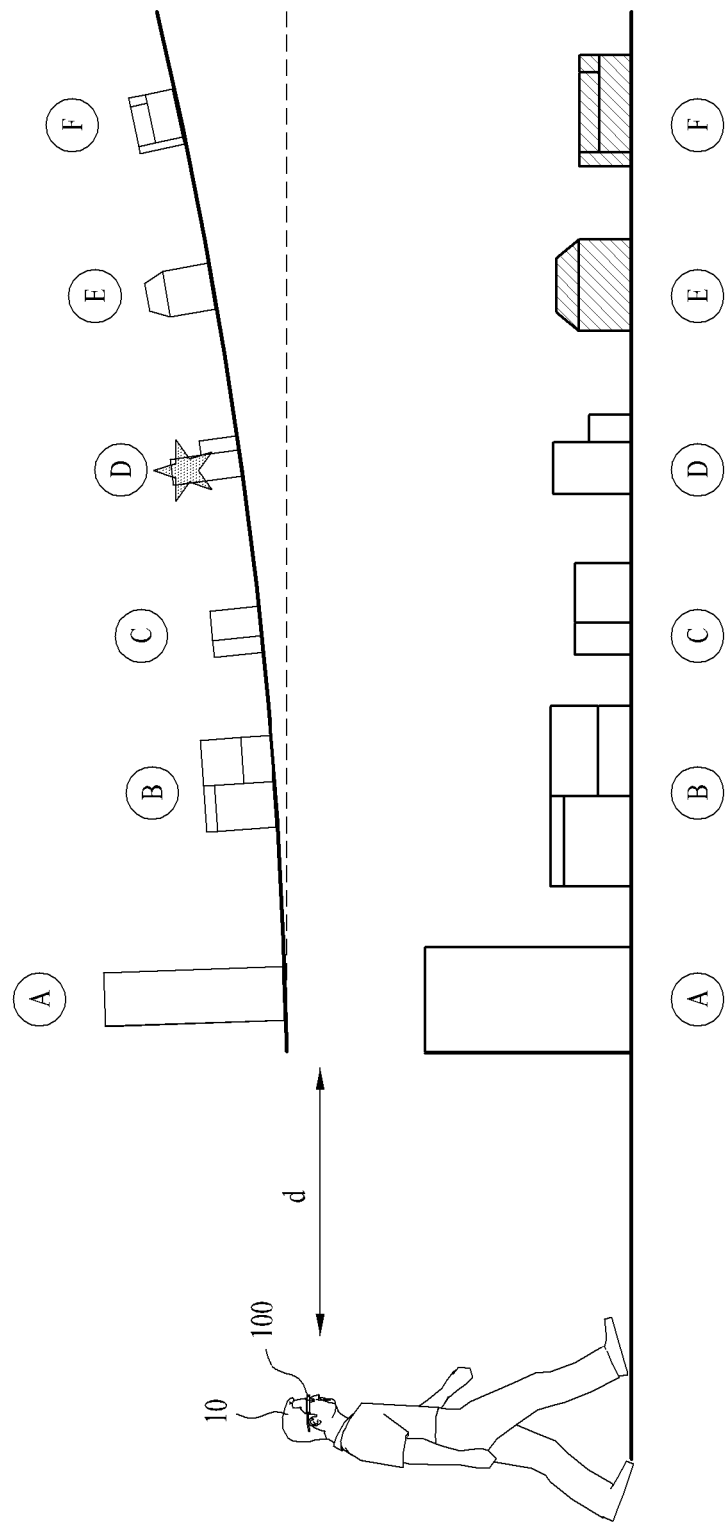

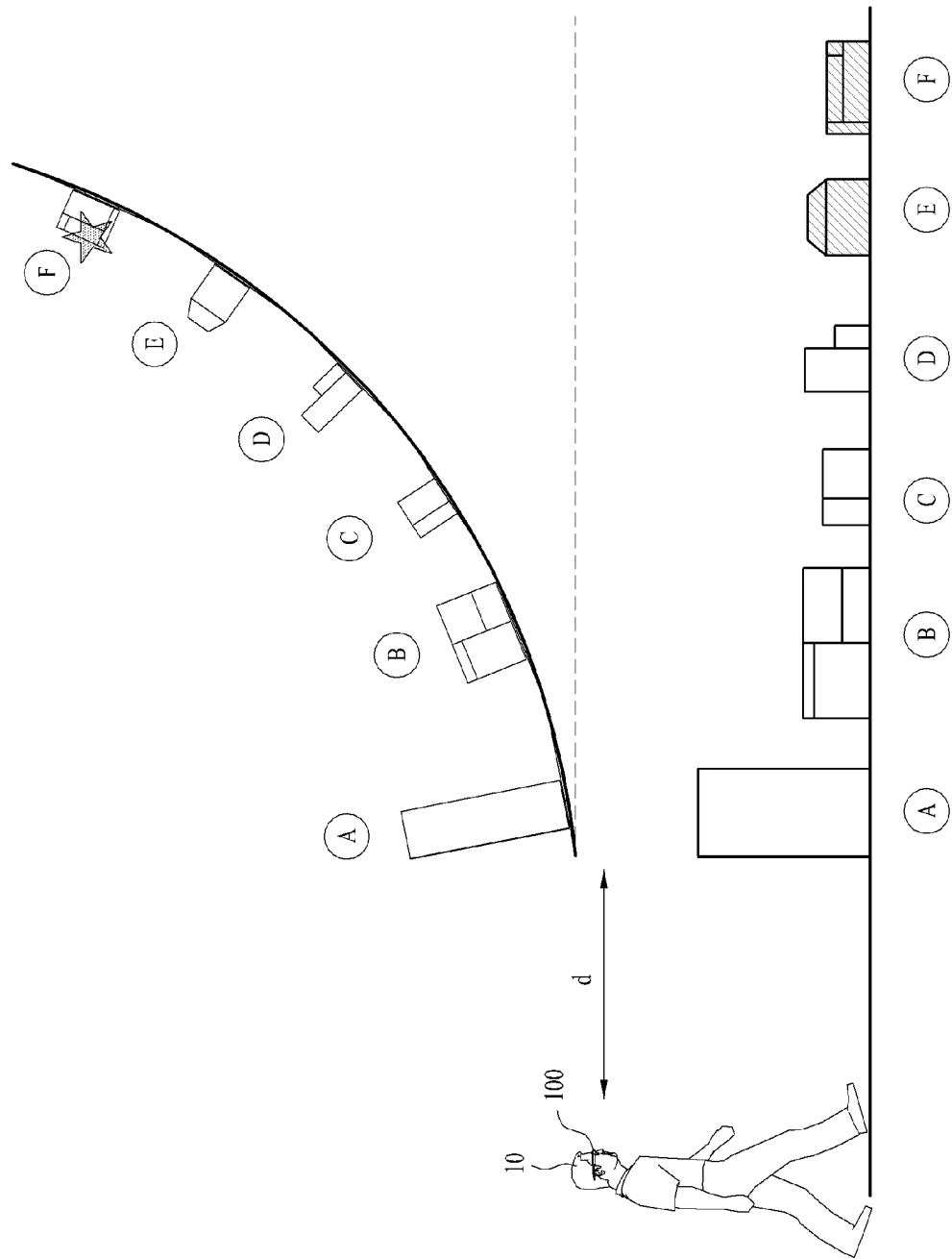

HEAD MOUNTED DISPLAY AND METHOD OF CONTROLLING THEREOF

Pursuant to 35 U.S.C. §119(a), this application claims the benefit of the Korean Patent Application No. 10-2014-0003971, filed on Jan. 13, 2014, which is hereby incorporated by reference as if fully set forth herein.

BACKGROUND OF THE INVENTION

Field of the Invention

The present specification relates to a head mounted display and a method of controlling therefor, and more particularly, to a method for a user wearing a head mounted display to recognize at least one object positioned at the front via a virtual map.

Discussion of the Related Art

Generally, a head mounted display (hereinafter abbreviated HMD) indicates various digital devices enabling a user to receive a multimedia content in a manner of being mounted on the head of the user like glasses. According to a trend of lightening and miniaturizing of a digital device, various wearable computers have been developed so far and the HMD is also widely used. The HMD can provide various conveniences as well as a simple display function to a user in a manner of being combined with an augmented reality technology, an N screen technology, and the like.

For instance, the HMD can provide a map application used for guiding a way to a user while the HMD is worn by the user. In particular, while the HMD is used in a see-through mode, the HMD can induce the user to easily navigate in a manner of separately displaying a map in the HMD in addition to objects, which are seen by the user via the HMD, positioned at the front of the user.

SUMMARY OF THE INVENTION

Accordingly, the present specification is directed to an apparatus and method thereof that substantially obviate one or more problems due to limitations and disadvantages of the related art.

In one embodiment, the present specification intends to provide a virtual map for indicating at least one object positioned at the front of an HMD as a curved map via the HMD.

In another embodiment, if a user does not recognize at least one object positioned at the front of the HMD, the present specification intends to provide a position of an object to the user in a manner of displaying a virtual object corresponding to the object incapable of being recognized by the user in a virtual map.

In another embodiment, the present specification intends to determine a slope of a virtual map displayed in the HMD based on an existence of a destination set by a user.

In another embodiment, if a destination exist set by a user, the present specification intends to determine a slope of a virtual map based on a distance between the HMD and the destination.

In another embodiment, when a destination does not exist set by a user, if the HMD moves forward, the present specification intends to modify a virtual map based on a position of the HMD, which has moved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a head mounted display (HMD) includes a display unit configured to display visual information, a position sensing unit configured to sense a position of the HMD, a camera unit configured to sense at least one object positioned at the front of the HMD, and a processor configured to control the display unit, the position sensing unit, and the camera unit, wherein the processor is further configured to: obtain position information of the HMD, generate a first virtual map indicating a virtual object corresponding to the at least one object positioned at the front of the HMD, based on the position information of the HMD, and display the first virtual map, wherein the first virtual map corresponds to a curved map which is displayed on top of a first object and wherein a degree of a slope increases as a distance from the HMD increases.

To further achieve these objects and other advantages and in accordance with the purpose of the invention, as embodied and broadly described herein, in another embodiment, a method of controlling a head mounted display (HMD) includes the steps of obtaining position information of the HMD, generating a first virtual map indicating a virtual object corresponding to the at least one object positioned at the front of the HMD, based on the position information of the HMD, and displaying the first virtual map, wherein the first virtual map corresponds to a curved map which is displayed on top of a first object and it's a degree of a slope increases as a distance from the HMD increases.

Accordingly, the present specification provides the following effects or advantages.

In one embodiment, a user can recognize a position of an object positioned at the front of the HMD via a virtual map besides the object seen by the user through the HMD.

In another embodiment, a user can easily recognize an object, which is incapable of being recognized by the user, via a virtual map represented as a curved map while wearing the HMD.

In another embodiment, a user can be provided with a virtual map including various slopes based on an existence of a destination set by the user.

In another embodiment, when the destination exists which is set by a user, the user can be provided with a virtual map including various slopes based on a distance between the HMD and the destination.

In another embodiment, when the destination does not exist which is set by a user, if the user moves forward, the user can be provided with a virtual map modified based on a position of the user that has moved.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram for an image that a HMD faces at least one object positioned at the front of the HMD via the HMD;

FIG. 4a and FIG. 4b are diagrams for a second embodiment of a method of controlling a HMD according to the present specification;

FIG. 5a and FIG. 5b are diagrams for a third embodiment of a method of controlling a HMD according to the present specification;

FIG. 7a and FIG. 7b are diagrams for a fifth embodiment of a method of controlling a HMD according to the present specification;

FIG. 8a and FIG. 8b are diagrams for a sixth embodiment of a method of controlling a HMD according to the present specification;

DETAILED DESCRIPTION OF THE INVENTION

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been described in detail with reference to the attached drawings and the contents written on the diagrams, the present specification may be non-restricted or non-limited to the embodiments.

Figure 1:
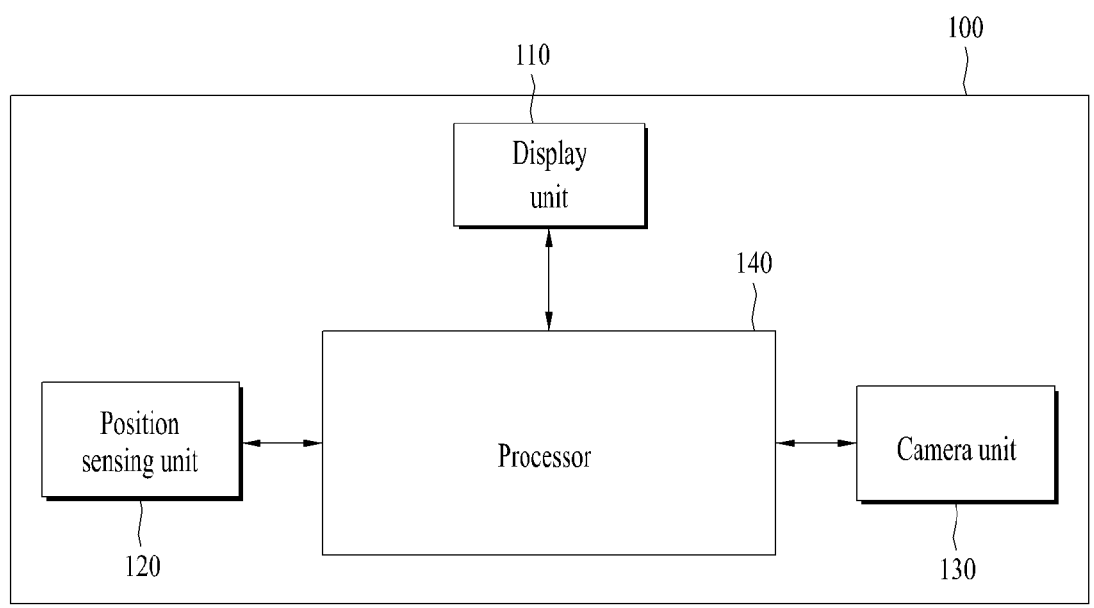
FIG. 1 is a block diagram of a head mounted display (HMD) according to the present specification.

FIG. 1 is a block diagram of a head mounted display (HMD) according to the present specification. Yet, FIG. 1 is one embodiment. A part of configuration module can be deleted or a new configuration module can be added according to the necessity of those skilled in the art.

As depicted in FIG. 1, an HMD 100 according to one embodiment can include a display unit 110, a position sensing unit 120, a camera unit 130, and a processor 140.

The display unit 110 can display visual information. In this case, the visual information can include content, an application, an image, a video, and the like. And, the display unit 110 can output the visual information in a screen based on a control command of the processor 140.

Meanwhile, in the present specification, the HMD 100 can output an image in the display screen in various modes. In one embodiment, the HMD 100 can output an image in a see-through mode. In this case, the see-through mode indicates that the display screen is transparent. The see-through mode indicates a mode capable of using content while a user wearing the HMD 100 is recognizing the surrounding environment. In another embodiment, the HMD 100 can output an image in a front-light mode. In this case, the front-light mode indicates a mode capable of displaying an image to which a light is reflected without directly projecting to eyes via such a reflector as a mirror.

Also, in another embodiment, the HMD 100 can output an image in a see-closed mode. In this case, the see-closed mode indicates a mode using contents via the display screen in a state of incapable of seeing an external environment via the display screen. The present specification is explained under an assumption that the HMD 100 displays an image in the see-through mode.

According to the present specification, a display unit 110 can display a virtual map for indicating at least one object positioned at the front of the HMD 100. And, the virtual map is displayed on the top of a first object. As a distance between the at least one object and the HMD 100 increases, degree of slope may increase. Regarding this, it shall be described again in embodiments of FIG. 3 to FIG. 8.

The position sensing unit 120 senses a position of the HMD 100 using at least one sensor installed in the HMD 100 and can deliver the sensed result to the processor 140 in a signal form.

The position sensing unit 120 can include at least one sensing means. As an embodiment, the at least one sensing means can include such a sensing means as a gravity sensor, a terrestrial magnetism sensor, a motion sensor, a gyroscope sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a grip sensor, and the like.

And, the position sensing unit 120 is a common name for the aforementioned various sensing means. The sensing unit senses various inputs of a user and environment of the HDM 100 and can deliver a sensed result to the processor 140 in order for the processor to perform an operation in accordance with the sensed result. The aforementioned sensors may be included in the HMD 100 as a separate element or may be included in the HMD in a manner of being integrated into at least one element.

According to the present specification, the position sensing unit 120 can sense position information of the HMD 100. In this case, the position information of the HMD 100 may include a geographical position of the HMD 100, height of the HMD 100 above the ground, speed of the HMD 100, and the like.

The camera unit 130 can take a picture of an image. More specifically, the camera unit 130 can take a picture of an image of a front direction. In this case, the front direction may correspond to a direction at which the camera unit 130 faces. And, the camera unit 130 senses an image within an angle of view area and can deliver the image to the processor 140. In this case, the angle of view area indicates a range of a horizontal and vertical viewing angle capable of being included in a prescribed screen in case of sensing an image.

According to the present specification, the camera unit 130 can sense at least one object positioned at the front of the HMD 100. And, the camera unit 130 can sense height of the at least one object positioned at the front of the HMD.

The processor 140 processes data, controls each of the units of the aforementioned HMD 100, and controls data transmission/reception between the units. In the present specification, the processor 140 can acquire position information of the HMD 100. Moreover, the processor 140 can generate a first virtual map indicating a virtual object corresponding to the at least one object positioned at the front of the HMD 100, based on the position information of the HMD 100. The processor 140 can display the first virtual map. Regarding this, it shall be described again in embodiments of FIG. 3 to FIG. 8.

As one embodiment of the present specification, operations performed by the HMD 100 can be controlled by the processor 140. For clarity, in the following description and diagrams, these operations are commonly depicted and explained in a manner that the HMD 100 performs/controls the operations.

Meanwhile, although it is not depicted in FIG. 1, the HMD 100 can include a communication unit, a power unit, a storage unit, an audio unit, and the like. The communication unit performs a communication with an external device using various protocols and can transceiver a data with the external device using the various protocols. And, the communication unit can transmit/receive such a digital data as content and the like by accessing a network in wired or wireless. For instance, the communication unit can use such a communication standard as WLAN (Wireless LAN) (Wi-Fi), Wibro (Wireless broadband), Wimax (World Interoperability for Microwave Access), HSDPA (High Speed Downlink Packet Access) to access a wireless network.

The power unit is a power source connected to an internal battery or an external power supply of the HMD 100. The power unit can supply power to the HMD 100. And, the storage unit can store such various digital data as an audio, a picture, a video, an application, and the like. The storage unit may indicate such various digital data storage spaces as a flash memory, RAM (random access memory), SSD (solid state drive), and the like. The audio unit can receive/output an audio data via a microphone and a speaker.

The HMD 100 depicted in FIG. 1 is a block diagram according to one embodiment. Blocks represented in a manner of being separated indicate the logically distinguished elements of the HMD 100. Hence, the elements of the aforementioned HMD 100 can be equipped with a single chip or a plurality of chips according to the design of the device.

FIG. 2 is a diagram for an image that a HMD faces at least one object positioned at the front of the HMD via the HMD. More specifically, FIG. 2 shows that a virtual map is not displayed in a display unit 110 of the HMD 100 and objects positioned at the front of the HMD are provided to a user through the HMD.

In the present specification, assume that a user is wearing the HMD 100. And, in the present specification, the MID 100 may include a pair of display units 110 of a see-through mode. Since a pair of display units 110 display an identical content, the present specification is described on the basis of the content displayed in one part of the display unit 110.

First of all, the HMD 100 can show at least one object positioned at the front of the HMD to a user. In this case, since the display unit 110 of the HMD 100 operates in the see-through mode, the user can easily see the object positioned at the front of the HMD 100. In particular, as depicted in FIG. 2, the user wearing the HMD 100 can see such an object positioned at the front of the HMD as A (A1, A2), B (B1, B2), C (C1, C2), and D (D1, D2) via the HMD 100. In this case, an A1 and an A2 object correspond to objects positioned at front left and front right, respectively on the basis of the HMD 100 and assume that the objects are positioned at an identical distance from the HMD 100. The aforementioned assumption may be identically applied to B to D objects.

While providing the objects positioned at the front of the HMD in the display unit 110 with the see-through mode, the HMD 100 can display various contents in the display unit 110 at the same time. For instance, as depicted in FIG. 2, the HMD 100 can display such contents as clock, notification of arrival of a text message, and the like in the display unit 110. The contents can be translucently displayed in order not to block a view of a user. By doing so, the user recognizes an object positioned at the front of the user via the HMD 100 and can use such various contents as a text, a telephone call and the like at the same time.

Meanwhile, a user may want to know a position of a remaining object except the object recognizable by the user wearing the MID 100 at the front of the user. In this case, the HMD 100 can provide map content to the user. In this case, for convenience of the user, it is necessary for the HMD 100 to provide a map in a manner of not being duplicated with the object positioned at the front of the HMD. Regarding this, a method of providing a virtual map easily recognizable by a user is described via embodiments of FIG. 3 to FIG. 8

Figure 3A:
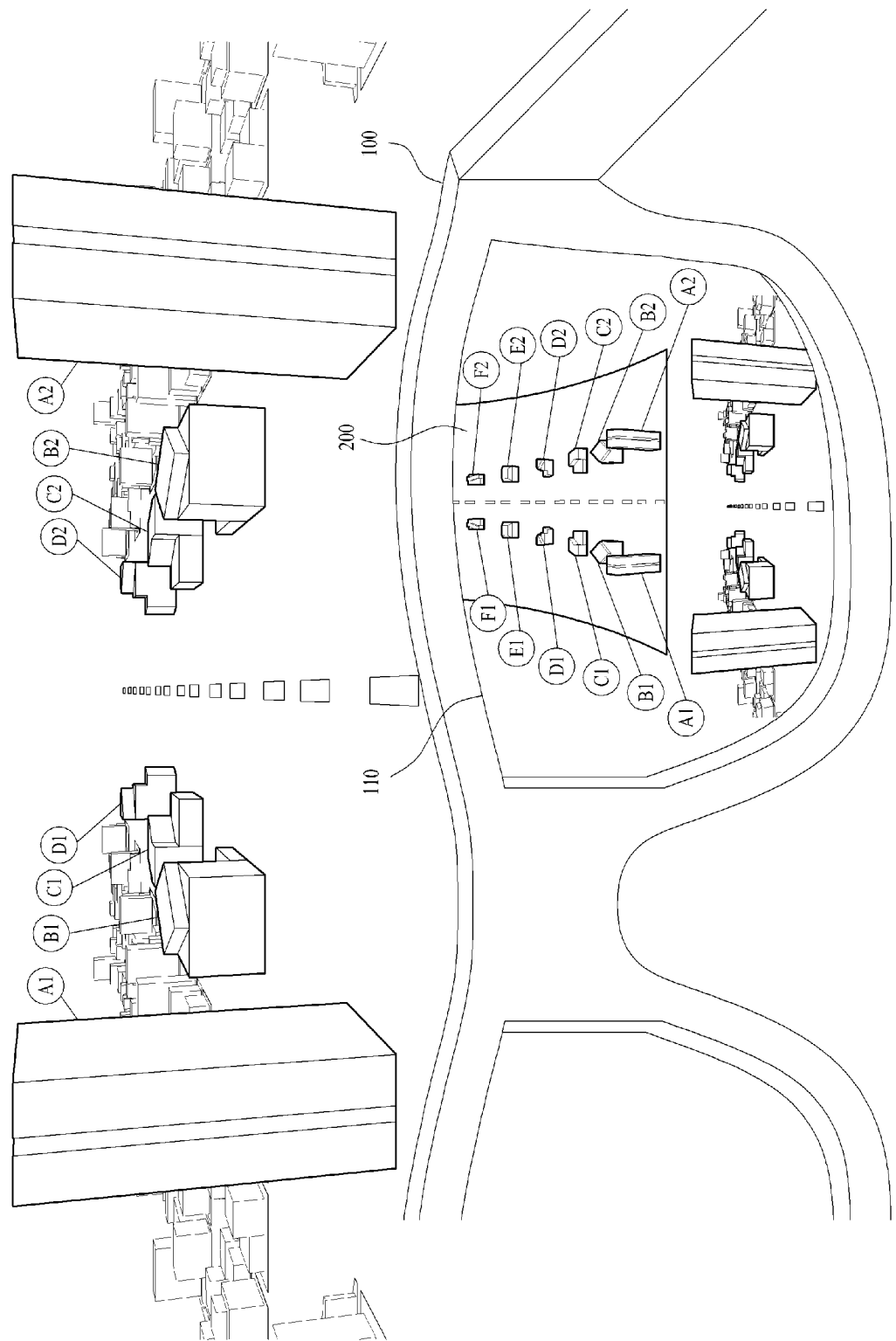
FIG. 3a and FIG. 3b are diagrams for a first embodiment of a method of controlling a HMD according to the present specification.
Figure 3B:
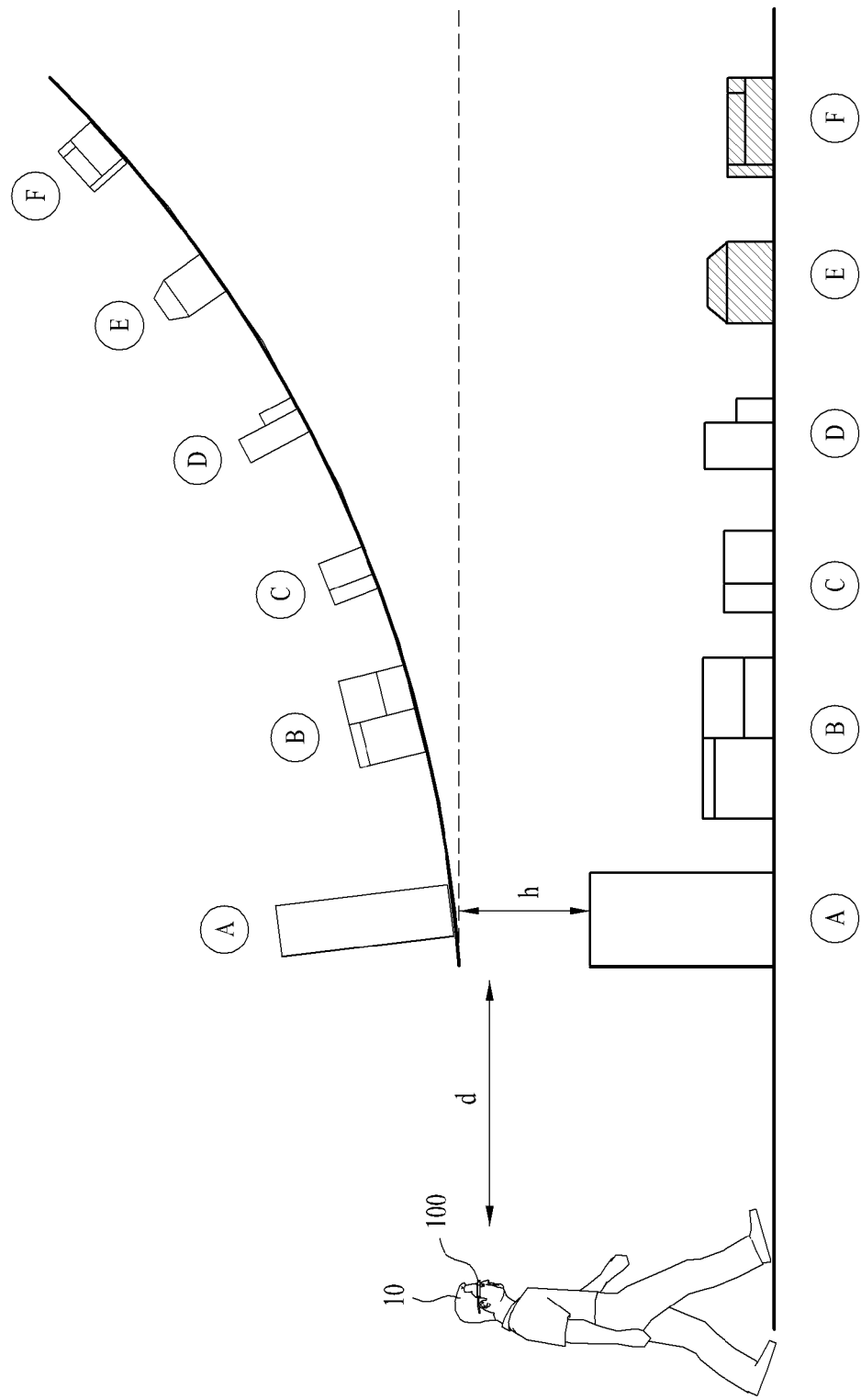

FIG. 3 is a diagram for a first embodiment of a method of controlling a HMD according to the present specification. More specifically, FIG. 3a is a diagram for a first virtual map 200 provided to a user wearing a HMD 100 and FIG. 3b is a diagram for a slope of the first virtual map 200 provided to the user 10 wearing the HMD 100.

First of all, the HMD 100 detects an input signal from the user 10 and may execute a map application. In this case, the input signal may include a gesture signal, an audio signal, a touch signal and the like. In this case, the HMD 100 can acquire position information of the HMD 100. In this case, the position information of the HMD 100 may include a geographical position of the HMD 100, height of the HMD 100, moving speed of the HMD 100, and the like. For instance, the geographical position of the HMD 100 is a geographical coordinate and may correspond to the position of the HMD 100 recognized by a GPS. And, for instance, the height of the HMD 100 indicates height of the HMD 100 above the ground recognized by a camera or the GPS and the moving speed of the HMD 100 may indicate moving speed of the HMD 100 recognized by the GPS. Besides, the position information of the HMD 100 may include various informations.

Subsequently, the HMD 100 may generate a first virtual map, which indicates a virtual object corresponding to at least one object positioned at the front of the HMD 100, based on the acquired position information of the HMD 100. In this case, the virtual object corresponds to an object virtually indicating the at least one object positioned at the front of the HMD 100. As depicted in FIG. 3a and FIG. 3b, the virtual object can be displayed in a form similar to a real object. Moreover, the virtual object can be displayed in 2D (2 dimensions) or 3D (3 dimensions) based on a distance between the real object and the HMD 100.

In this case, the first virtual map 200 may correspond to a firstly provided virtual map in case that a user 10 executes a map application. And, the first virtual map 200 is a map indicating the at least one object positioned at the front of the HMD 100 and may display an object not recognized by the user 10 as well as an object actually recognized by the user 10.

For instance, as depicted in FIG. 3a, the first virtual map 200 can display such an object incapable of being recognized by the user 10 as E and F object as well as such an object capable of being recognized by the user 10 as A, B, C, and D object. In this case, the object incapable of being recognized by the user 10 may correspond to an object positioned at a long distance from the HMD 100 or an object not recognizable by the user 10 since the object is blocked by a different object. In particular, the user can recognize an object positioned at a location where it is hard to recognize the object in the front using the first virtual map 200.

And, the HMD 100 can display the generated first virtual map 200 in the display unit 110. In this case, the first virtual map 200 may correspond to a curved map displayed on the top of a first object and its degree of slope increases as a distance from the HMD 100 increases. Moreover, the first virtual map 200 may be implemented by an AR (augmented reality) scheme as well. Besides, the first virtual map 200 can be implemented in the display unit 110 in various ways. Regarding this, referring to FIG. 3b, it is able to know that degree of slope of the first virtual map 200 increases as an object is getting far from the HMD 100, i.e., from A object to F object. Hence, a virtual object positioned where the degree of slope of the first virtual map 200 is steep may correspond to an object positioned at a long distance from the user 10. In this case, the object represented as A may correspond to A1 or A2 object depicted in FIG. 3a.

In one embodiment, a first object may correspond to an object positioned at a nearest location among the at least one object positioned at the front of the HMD 100. For instance, the first object may correspond to the A object (A1 or A2) in FIG. 3a. Hence, the HMD 100 can display the first virtual map 200 on the top of the A1 or the A2 object. In another embodiment, the first object may correspond to at least one object positioned at a predetermined distance from the HMD 100. For instance, in FIG. 3b, the first object may correspond to the A object which is positioned at the predetermined distance (d) from the HMD 100. Hence, the HMD 100 can display the first virtual map 200 on the top of the A object.

Meanwhile, the HMD 100 can obtain height of the at least one object positioned at the front of the HMD. The height can be obtained by the camera unit or the position sensing unit mentioned earlier in FIG. 1. Moreover, the HMD 100 can determine height of the first virtual map 200 based on the obtained height of the at least one object. More specifically, the HMD 100 can determine the height where the first virtual map 200 starts to be displayed based on the obtained height of the at least one object.

In one embodiment, the HMD 100 can display the first virtual map 200 on the top of a highest object among the at least one object positioned at the front of the HMD. For instance, as depicted in FIG. 3b, the HMD 100 can display the first virtual map 200 on the top of a predetermined height (h) from the A object, which is the highest object. In another embodiment, the HMD 100 can display the first virtual map 200 on the top of a predetermined object among the at least one object positioned at the front of the HMD. For instance, the predetermined object may correspond to a destination set by a user 10. Hence, the HMD 100 can display the first virtual map 200 on the top of the object corresponding to the destination set by the user 10.

Moreover, the HMD 100 can display a virtual object corresponding to the at least one object positioned at the front of the HMD in the first virtual map 200 without reversing the left and right of the virtual object. As depicted in FIG. 3a, the HMD 100 can display the virtual object corresponding to the at least one object on the top of the at least one object positioned at the front of the HMD. In this case, the virtual object is displayed on the first virtual map 200 while identically maintaining a direction of the at least one object positioned at the front without reversing the left and right of the direction. In particular, the HMD 100 can provide a position to a user 10 via the first virtual map 200 in a state that left and right of the at least one object is not reversed.

In the following description for FIG. 4 to FIG. 8, when a user 10 wearing the HMD 100 uses a map application, a method of providing the virtual map 200 in accordance with an existence of a destination is explained. In the following description, assume a state that the HMD 100 is worn by the user 10.

FIG. 4 is a diagram for a second embodiment of a method of controlling the HMD according to the present specification. More specifically, FIG. 4a is a diagram for a second virtual map 200 provided to the user 10 in case that the destination set by the user 10 does not exist and FIG. 4b is a diagram for degree of slope of the second virtual map 200 provided to the user 10 in case that the destination set by the user does not exist.

First of all, assume FIG. 4 shows a state that the user 10 has moved forward on the basis of a position of the HMD 100 depicted in FIG. 3. More specifically, assume FIG. 4a and FIG. 4b show a state that the user 10 is positioned at a location where the user 10 has passed a position of the object A or the object A by.

In this case, the HMD 100 can obtain position information of the HMD 100. Compared to the aforementioned FIG. 3, the position information of the HMD 100 may correspond to the position information of the HMD 100 that has moved. Moreover, the HMD 100 can generate a second virtual map 200 based on the position information. In this case, the second virtual map 200 may correspond to a virtual map, which indicates a virtual object corresponding to the at least one object positioned at the front of the HMD 100 based on the position information of the HMD 100 that has moved. Referring to FIG. 4a, the HMD 100 can display virtual objects corresponding to such an object positioned at the front of the HMD 100 as B, C, D, and E object in the second virtual map 200. Moreover, the HMD 100 can display such an object positioned at the front of the HMD while it is not seen by a view of a user 10 as F and G object in the second virtual map 200. By doing so, the user 10 can recognize the position of the objects, which are not seen by the view of the user, via the second virtual map 200. And, since the HMD 100 has passed the A object by, the HMD may not display the A object on the second virtual map 200.

Subsequently, the HMD 100 can display the generated second virtual map 200 in the display unit 110. More specifically, the HMD 100 can display the second virtual map 200 on the top of a first object. As mentioned earlier in FIG. 3, the first object may correspond to at least one object positioned at the front of the HMD 100. And, the first object may correspond to at least one object positioned at a predetermined distance from the HMD 100. The second virtual map 200 may be implemented by an AR (augmented reality) scheme.

In this case, the second virtual map 200 may correspond to a curved map of which degree of slope increases as a distance from the HMD 100 increases. And, degree of slope of the second virtual map 200 may be identical to the degree of slop of the first virtual map depicted in FIG. 3. This is because, in case of FIG. 3 and FIG. 4 corresponding to a state when the destination does not exist which is set by a user 10, as a user moves forward, a virtual object displayed in the virtual map is modified only without changing the degree of slope of the virtual map. Hence, referring to FIG. 4b, in a state that the degree of slope of the second virtual map 200 is identical to that of the first virtual map depicted in FIG. 3b, it is able to know that the virtual object consisting of the second virtual map is modified only.

In particular, if a user 10 moves forward while a destination is not set in a map application, virtual objects provided to the user may be modified while degree of slope of a displayed virtual map is not modified. Hence, the user 10 can recognize that the virtual object, which is displayed on the second virtual map 200, is modified in real time as the user moves forward.

Subsequently, when a destination set by a user 10 exist, FIG. 5 and FIG. 6 show a case that degree of slope of the first virtual map 200 is determined based on a distance between the destination and the HMD 100.

Figure 5B:
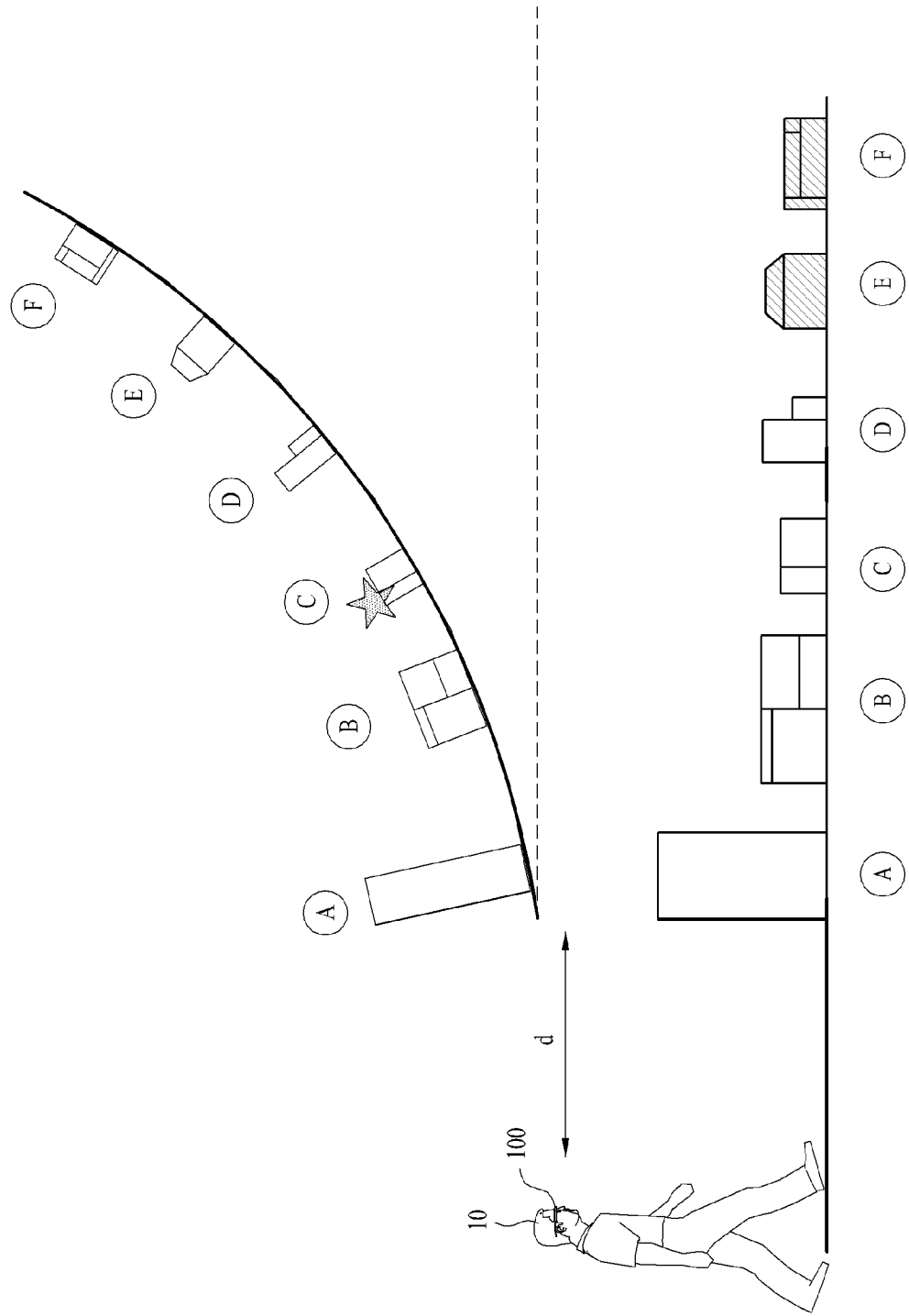

First of all, FIG. 5 is a diagram for a third embodiment of a method of controlling the HMD according to the present specification. More specifically, FIG. 5a is a diagram for a first virtual map 200 provided to the user 10 in case that the destination set by the user is positioned within a predetermined distance range from the HMD 100 and FIG. 5b is a diagram for degree of slope of the first virtual map 200 provided to the user 10 in case that the destination set by the user is positioned within the predetermined distance range from the HMD 100.

Meanwhile, when a destination set by the user 10 exists, the HMD 100 can display a destination indicator 210 indicating the destination on the first virtual map 200. Referring to FIG. 5a, C2 object can be set as a destination in the HMD 100 by the user. In this case, the HMD 100 can display the destination indicator 210 on the C2 object among the virtual objects displayed on the first virtual map 200. By doing so, the user can easily recognize a position of the destination set by the user.

And, if a destination is positioned within a predetermined distance range from the HMD 100, the HMD 100 can relatively steeply display the degree of slope of the first virtual map 200. More specifically, the HMD 100 can display the degree of slope of the first virtual map 200 more steeply when the destination is positioned within the predetermined distance range from the HMD 100 than when the destination is positioned outside of the predetermined distance range from the HMD 100.

For instance, it may assume that the predetermined distance range in FIG. 5 corresponds to a distance range between the HMD 100 and D object (D1, D2). In this case, the C2 object, which is the destination set by the user, may correspond to a destination positioned within the predetermined distance range. Hence, as depicted in FIG. 5b, the HMD 100 can the degree of slope of the first virtual map 200 more steeply compared to the degree of slope of the first virtual map depicted in FIG. 3b. By doing so, since the user 10 can check the position of the C2 object in a state that the degree of slope of the first virtual map 200 is steep, the user can recognize that the destination is not far from the HMD 100. Moreover, as depicted in FIG. 5b, since E and F object, which are not directly recognized by the user 10, are provided to the user as virtual objects, the user 10 can recognize a position of the E and F object via the first virtual map 200.

Meanwhile, although it is not depicted in FIG. 5, when a destination is positioned within a predetermined distance range, if a user 10 wearing the HMD 100 moves forward, the HMD 100 can display a second virtual map based on a position of the HMD 100 that has moved. For instance, referring to FIG. 5a, if the user wearing the HMD 100 walks from the A object toward the B object, the HMD 100 can display the second virtual map based on the position of the HMD 100 that has moved. In this case, degree of slope of the second virtual map may be steeper than the degree of slope of the first virtual map depicted in FIG. 5. Hence, the user 10 can recognize that the B object, which is a destination displayed on the second virtual map, becomes closer.

Figure 6A:
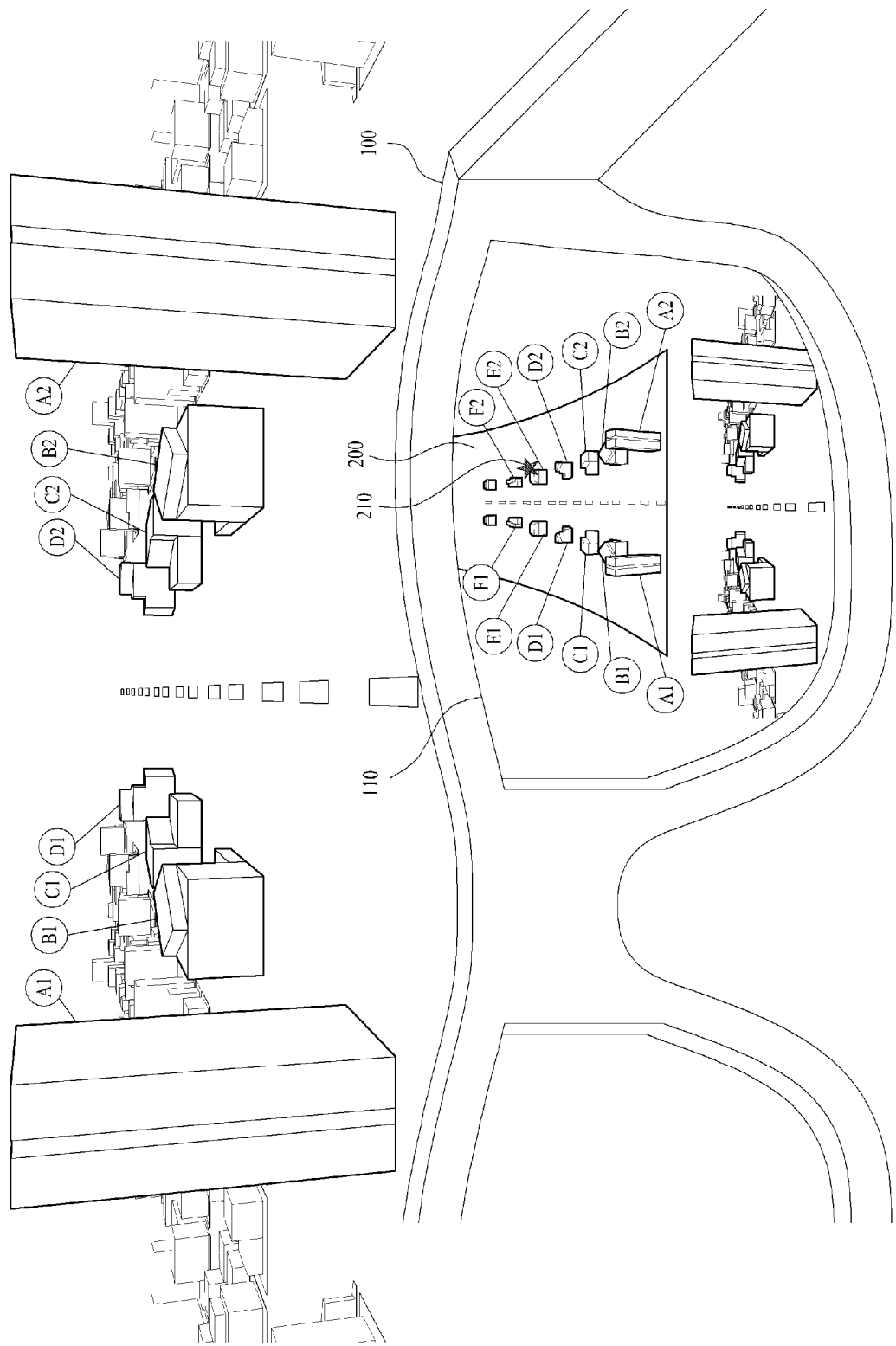
FIG. 6a and FIG. 6b are diagrams for a fourth embodiment of a method of controlling a HMD according to the present specification.
Figure 6B:
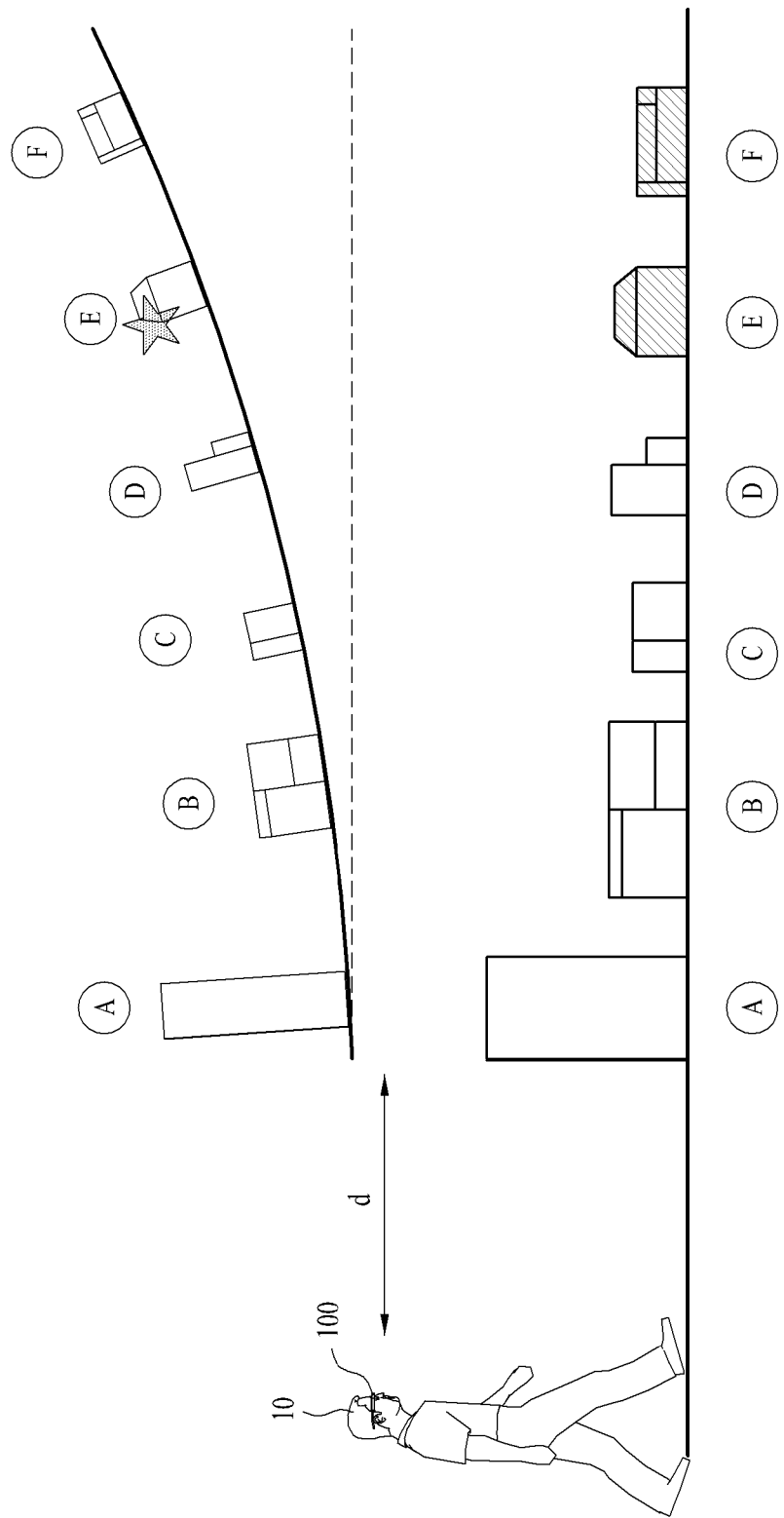

Subsequently, FIG. 6 is a diagram for a fourth embodiment of a method of controlling the HMD according to the present specification. More specifically, FIG. 6a is a diagram for a first virtual map 200 provided to a user 10 in case that a destination set by the user is positioned within a predetermined distance rage from the HMD 100 and FIG. 6b is a diagram for degree of slope of the first virtual map 200 provided to the user 10 in case that the destination set by the user is positioned within the predetermined distance rage from the HMD 100.

Meanwhile, as mentioned earlier in FIG. 5, when a destination set by the user 10 exists, the HMD 100 can display a destination indicator 210 indicating the destination on the first virtual map 200. Referring to FIG. 6a, E2 object can be set as a destination in the HMD 100 by the user. In this case, the HMD 100 can display the destination indicator 210 on the E2 object among the virtual objects displayed on the first virtual map 200.

And, if a destination is positioned outside of a predetermined distance range from the HMD 100, the HMD 100 can relatively display the degree of slope of the first virtual map 200. More specifically, the HMD 100 can display the degree of slope of the first virtual map 200 less steeply when the destination is positioned outside of the predetermined distance range from the HMD 100 than when the destination is positioned within the predetermined distance range from the HMD 100.

For instance, it may assume that the predetermined distance range in FIG. 6 corresponds to a distance range between the HMD 100 and D object (D1, D2). In this case, the E2 object, which is the destination set by the user, may correspond to a destination positioned out of the predetermined distance range. Hence, as depicted in FIG. 6b, the HMD 100 can more gently display the degree of slope of the first virtual map 200 compared to the degree of slope of the first virtual map depicted in FIG. 3b. By doing so, since the user 10 can check the position of the E2 object in a state that the degree of slope of the first virtual map 200 is less steep, the user can recognize that the destination is positioned at a location far from the HMD 100.

Meanwhile, although it is not depicted in FIG. 6, when a destination is positioned outside of a predetermined distance range, if a user 10 wearing the HMD 100 moves forward, the HMD 100 can display a second virtual map based on a position of the HMD 100 that has moved. For instance, referring to FIG. 6a, if the user wearing the HMD 100 walks from the A object toward the B object, the HMD 100 can display the second virtual map based on the position of the HMD 100 that has moved. In this case, degree of slope of the second virtual map may be steeper than the degree of slope of the first virtual map depicted in FIG. 6. Hence, the user 10 can recognize that the E object, which is a destination displayed on the second virtual map, becomes closer.

Meanwhile, the embodiment of FIG. 5 and that of FIG. 6 is just one embodiment, by which the present specification may be non-limited. For instance, the HMD 100 may display the degree of slope of the first virtual map 200 less steeply when a destination is positioned within a predetermined distance range from the HMD 100 than when the destination is positioned outside of the predetermined distance range from the HMD 100. Moreover, the HMD 100 may display the degree of slope of the first virtual map 200 more steeply when a destination is positioned outside of a predetermined distance range from the HMD 100 than when the destination is positioned within the predetermined distance range from the HMD 100.

Subsequently, when a destination set by a user exists, FIG. 7 and FIG. 8 show a case of determining degree of slope of a virtual map based on whether the destination corresponds to at least one object capable of being recognized by the user.

First of all, FIG. 7 is a diagram for a fifth embodiment of a method of controlling the HMD according to the present specification. More specifically, FIG. 7*a* is a diagram for a virtual map 200 provided to a user 10 in case that a destination set by the user is positioned among at least one object positioned at the front of the HMD 100 and FIG. 7*b* is a diagram for degree of slope of the virtual map 200 provided to the user 10 in case that the destination set by the user is positioned among at least one object positioned at the front of the HMD 100.

If a destination is positioned among at least one object positioned at the front of the HMD 100, the HMD 100 can display degree of slope of the first virtual map 200 less steeply. More specifically, the HMD 100 can display the degree of slope of the first virtual map 200 less steeply when the destination is positioned among the at least one object positioned at the front of the HMD 100 than when the destination is not positioned among the at least one object positioned at the front of the HMD.

In this case, the at least one object positioned at the front may correspond to an object recognizable by the user 10 when the first virtual map 200 is not displayed. For instance, in FIG. 7, the at least one object positioned at the front of the HMD 100 corresponds to A (A1, A2), B (B1, B2), C (C1, C2), and D (D1, D2). In particular, although there may exist various objects at the front of the HMD 100 except the aforementioned objects, assume that a user wearing the HMD 100 can recognize the aforementioned A, B, C, and D object in FIG. 7. Moreover, in FIG. 7, assume that a destination set by the user 10 corresponds to a D2 object. The destination set by the user is known in a manner that a destination indicator 210, which is displayed on the first virtual map 200, is positioned at the D2 object.

In this case, as depicted in FIG. 7*b*, the HMD 100 can display the degree of slope of the first virtual map 200 more gently compared to the degree of slope of the virtual map depicted in FIG. 3*b*. This is because, since the destination is positioned among the objects recognizable by the user 10, it is not necessary to show the destination in front of the user 10 in a manner of steeply displaying the degree of slope of the first virtual map 200. In particular, if the degree of slope of the first virtual map 200 is gentle, the user 10 can easily find out the destination among the objects positioned at the front of the MID 100 although the user does not look at the first virtual map 200.

Meanwhile, although it is not depicted in FIG. 7, when a destination is positioned among at least one of the object positioned at the front of the HMD 100, if a user 10 wearing the HMD 100 moves forward, the HMD 100 can display a second virtual map based on a position of the HMD 100 that has moved. For instance, referring to FIG. 7*b*, if the user wearing the HMD 100 moves from a position of A object to a position of B object, the HMD 100 can display the second virtual map based on the position of the HMD that has moved. In this case, the second virtual map may have more gentle degree of slope compared to the virtual map 100 depicted in FIG. 7*b*. Hence, the user 10 can recognize that the D2 object, which is the destination displayed on the second virtual map, becomes closer to the user.

Figure 8A:
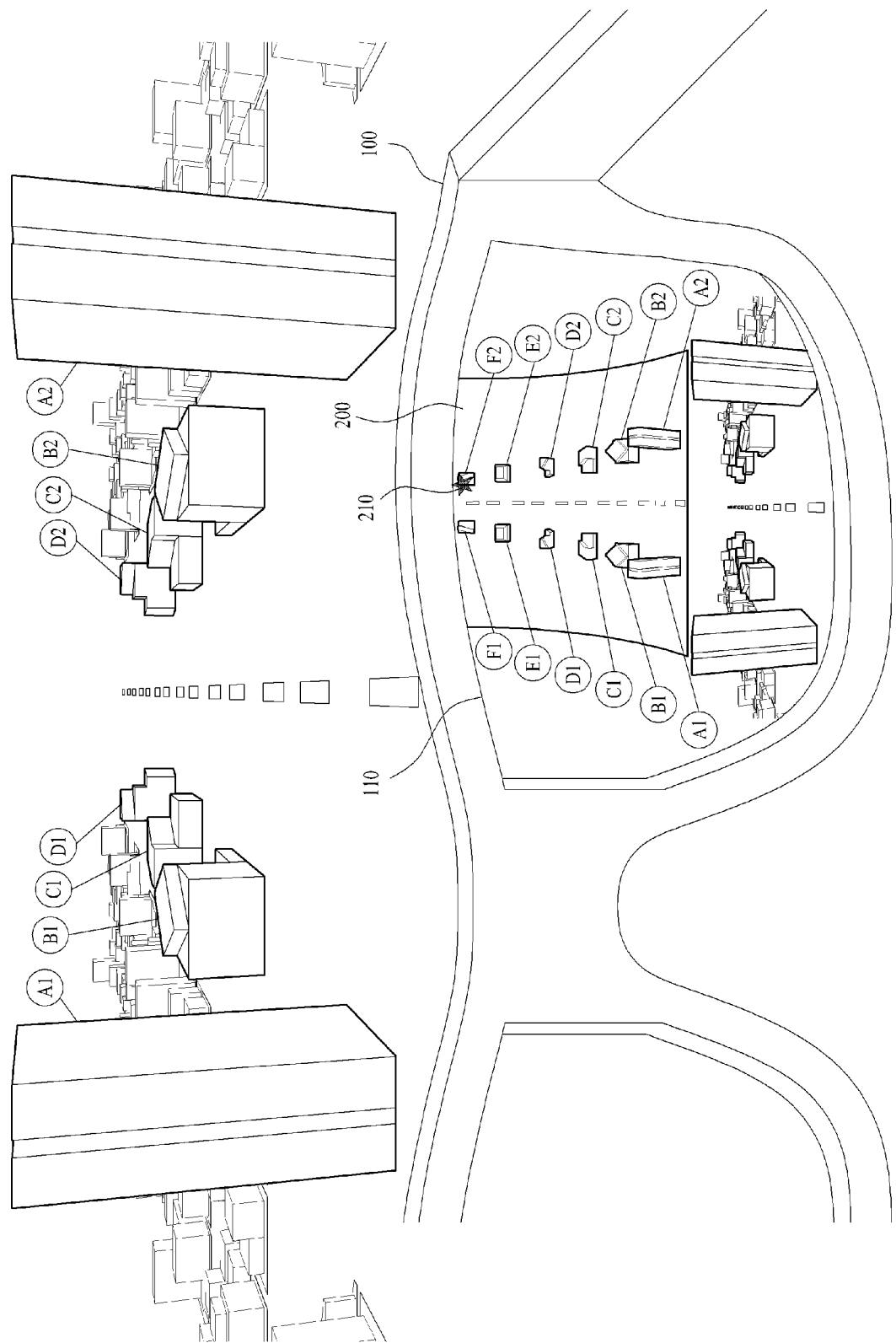

Subsequently, FIG. 8 is a diagram for a sixth embodiment of a method of controlling the HMD according to the present specification. FIG. 8*a* is a diagram for a virtual map 200 provided to a user 10 in case that a destination set by the user is not positioned among at least one object positioned at the front of the HMD 100 and FIG. 8*b* is a diagram for degree of slope of the virtual map 200 provided to the user 10 in case that the destination set by the user is not positioned among the at least one object positioned at the front of the HMD 100.

If a destination is not positioned among at least one object positioned at the front of the HMD 100, the HMD 100 can relatively steeply display degree of slope of the first virtual map 200. More specifically, the HMD 100 can display the degree of slope of the first virtual map 200 more steeply when the destination is not positioned among the at least one object positioned at the front of the HMD than when the destination is positioned among the at least one object positioned at the front of the HMD.

For instance, in FIG. 8, the at least one object positioned at the front of the HMD 100 corresponds to A (A1, A2), B (B1, B2), C (C1, C2), and D (D1, D2). In particular, although there may exist various objects at the front of the HMD 100 except the aforementioned objects, assume that a user wearing the HMD 100 can recognize the aforementioned A, B, C, and D object in FIG. 8. Moreover, in FIG. 8, assume that a destination set by the user 10 corresponds to a F2 object. In this case, although the user 10 wearing the HMD 100 is unable to directly see the F2 object, the user can recognize the F2 object via a virtual object displayed on the first virtual map 200.

In this case, as depicted in FIG. 8*b*, the HMD 100 can display the degree of slope of the first virtual map 200 more steeply compared to the degree of slope of the first virtual map depicted in FIG. 3*b*. This is because, since the destination does not correspond to one of the objects recognizable by the user 10, it is necessary for the HMD to enable the user 10 to easily find out the destination on the first virtual map 200 in a manner of steeply displaying the degree of slope of the first virtual map 200.

Meanwhile, although it is not depicted in FIG. 8, when a destination is not positioned among at least one of the object positioned at the front of the HMD 100, if a user 10 wearing the HMD 100 moves forward, the HMD 100 can display a second virtual map based on a position of the MMD 100 that has moved. For instance, referring to FIG. 8*b*, if the user wearing the HMD 100 moves from a position of A object to a position of B object, the HMD 100 can display the second virtual map based on the position of the HMD that has moved. In this case, the second virtual map may have more gentle degree of slope compared to the virtual map 100 depicted in FIG. 8*b*. Hence, the user 10 can recognize that the F2 object, which is the destination displayed on the second virtual map, becomes closer to the user.

Meanwhile, the embodiment of FIG. 7 and that of FIG. 8 is just one embodiment, by which the present specification may be non-limited. For instance, the HMD 100 may display the degree of slope of the first virtual map 200 more steeply when a destination is positioned among at least one object positioned at the front of the HMD than when the destination does not correspond to the at least one object positioned at the front of the HMD. Moreover, for instance, the HMD 100 may display the degree of slope of the first virtual map 200 more gently when the destination is not positioned among the at least one object positioned at the front of the HMD than when the destination corresponds to the at least one object positioned at the front of the HMD.

Figure 9:
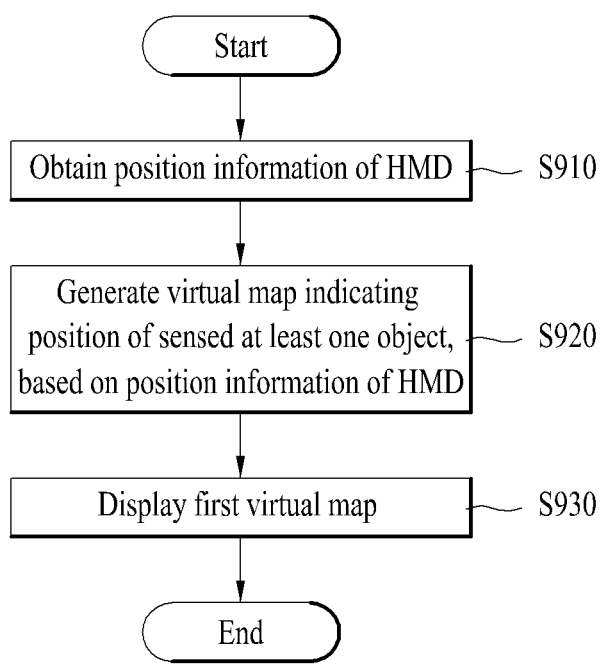
FIG. 9 is a flowchart for a method of controlling a HMD according to the present specification.

FIG. 9 is a flowchart for a method of controlling a HMD according to the present specification.

First of all, the HMD can obtain position information of the HMD [S910]. In this case, assume that the HMD is worn by a user. And, as mentioned earlier in FIG. 3, the position information may include a geographical position of the HMD, height of the HMD, moving speed of the HMD, and the like.

Subsequently, the HMD can generate a first virtual map, which indicates a virtual object corresponding to at least one object positioned at the front of the HMD, based on the position information of the HMD [S920]. As mentioned earlier in FIG. 3, the first virtual map can display a virtual object of an object incapable of being recognized by a user due to a street, barriers, and the like as well as a virtual object corresponding to an object capable of being recognized by the user.

Subsequently, the HMD can display the first virtual map [S930]. As mentioned earlier in FIG. 3, the first virtual map may correspond to a curved map displayed on the top of a first object and its degree of slope increases as a distance from the HMD increases. And, the first virtual map can be implemented by an AR scheme. In one embodiment, the first object may correspond to an object most nearly positioned among at least one object positioned at the front of the HMD. In another embodiment, the first object may correspond to at least one object positioned at a predetermined distance from the IIHMD. Meanwhile, the HMD can display the at least one object positioned at the front of the HMD on the first virtual map without reversing left and right of the at least one object.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A head mounted display and a method of controlling therefor according to one embodiment of the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a method of controlling a head mounted display can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included in the recording media. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on both of the inventions can be complementally applied, if necessary.

What is claimed is:

1. A head mounted display (HMD), comprising:
a display unit configured to display visual information;
a position sensing unit configured to sense a position of the HMD;
a camera unit configured to sense at least one object positioned at a front of the HMD; and
a processor configured to control the display unit, the position sensing unit, and the camera unit,
wherein the processor is further configured to:
obtain position information of the HMD,
generate a first virtual map indicating a virtual object corresponding to the at least one object positioned at the front of the HMD, based on the position information of the HMD, and
display the first virtual map in a first slope or a second slope while the HMD is worn by a user, wherein the first virtual map corresponds to a curved map which is displayed on top of a first object and wherein a degree of a slope of the curved map increases as a distance from the HMD increases,
wherein the first slope corresponds to a slope when a destination is positioned within a predetermined distance range from the HMD, and the second slope corresponds to a slope when the destination is positioned outside the predetermined distance range from the HMD, and
wherein the first slope is steeper than the second slope.

2. The HMD of claim 1, wherein the first object corresponds to a most nearly positioned object among the at least one object positioned at the front of the HMD.

3. The HMD of claim 1, wherein the first object corresponds to at least one object positioned at a predetermined distance from the HMD.

4. The HMD of claim 1, wherein the first virtual map displays the at least one object without reversing left and right of the at least one object.

5. The HMD of claim 1, wherein if a user wearing the HMD moves forward, the processor is further configured to display a second virtual map based on a position of the HMD which has moved when the destination does not exist.

6. The HMD of claim 5, wherein a degree of a slope of the second virtual map is identical to the degree of the slope of the first virtual map.

7. The HMD of claim 1, wherein if the destination is positioned within the predetermined distance range from the HMD, the processor is further configured to display a second virtual map based on a position of the HMD, which has moved when a user wearing the HMD moves forward, wherein a degree of a slope of the second virtual map is steeper than the degree of slope of the first virtual map.

8. The HMD of claim 1, wherein the processor is further configured to display the degree of the slope of the first virtual map more steeply when the destination is positioned among the at least one object than when the destination is not positioned among the at least one object.

9. The HMD of claim 8, wherein if the destination is positioned among the at least one object, the processor is configured to display a second virtual map based on a position of the HMD, which has moved when a user wearing the HMD moves forward, and wherein a degree of a slope of the second virtual map is more gentle than the degree of slope of the first virtual map.

10. The HMD of claim 8, wherein the at least one object corresponds to an object recognizable by a user in a state when the first virtual map is not displayed.

11. The HMD of claim 1, wherein the processor is further configured to:

obtain a height of the at least one object, and determine a height of the first virtual map based on the height of the at least one object.

12. The HMD of claim 11, wherein the processor is further configured to display the first virtual map on the top of a highest object among the at least one object.

13. The HMD of claim 1, wherein the processor is further configured to display a destination indicator indicating the destination on the first virtual map when a destination exists.

14. The HMD of claim 1, wherein the HMD is in a state of being worn by a user.

15. The HMD of claim 1, wherein the position information of the HMD comprises a geographical position of the HMD, a height of the HMD, and a moving speed of the HMD.

16. The HMD of claim 1, wherein the first virtual map is implemented by augmented reality(AR).

17. A method of controlling a head mounted display (HMD), the method comprising:

obtaining position information of the HMD;

generating a first virtual map indicating a virtual object corresponding to the at least one object positioned at a front of the HMD, based on the position information of the HMD; and displaying the first virtual map in a first slope or a second slope while the HMD is worn by a user, wherein the first virtual map corresponds to a curved map which is displayed on top of a first object and a degree of a slope of the curved map increases as a distance from the HMD increases, wherein the first slope corresponds to a slope when a destination is positioned within a predetermined distance range from the HMD, and the second slope corresponds to a slope when the destination is positioned outside the predetermined distance range from the HMD, and wherein the first slope is steeper than the second slope.

* * * * *